(12) United States Patent
Tosi

(10) Patent No.: US 8,624,419 B2
(45) Date of Patent: Jan. 7, 2014

(54) DOWNHOLE POWER GENERATION BY WAY OF ELECTROMAGNETIC INDUCTION

(75) Inventor: Luis Phillipe Tosi, Houston, TX (US)

(73) Assignee: Chevron U.S.A., Inc., San Ramon, CA (US)

( * ) Notice: Subject to any disclaimer, the term of this patent is extended or adjusted under 35 U.S.C. 154(b) by 300 days.

(21) Appl. No.: 13/224,074

(22) Filed: Sep. 1, 2011

(65) Prior Publication Data

US 2013/0056984 A1   Mar. 7, 2013

(51) Int. Cl.
*F03B 13/00*   (2006.01)
(52) U.S. Cl.
USPC ............................. 290/54; 166/65.1; 290/43
(58) Field of Classification Search
USPC .................. 290/43, 50, 54; 166/65.1
See application file for complete search history.

(56) References Cited

U.S. PATENT DOCUMENTS

| | | | | |
|---|---|---|---|---|
| 7,083,008 | B2 * | 8/2006 | Thorp et al. ..................... | 175/57 |
| 7,190,084 | B2 * | 3/2007 | Hall et al. ....................... | 290/1 R |
| 7,434,634 | B1 * | 10/2008 | Hall et al. ....................... | 175/107 |
| 7,999,422 | B2 * | 8/2011 | Dorel ............................... | 310/26 |
| 2006/0191681 | A1 * | 8/2006 | Storm et al. ............. | 166/250.01 |
| 2007/0079989 | A1 * | 4/2007 | Bankston et al. ............... | 175/40 |
| 2008/0277941 | A1 * | 11/2008 | Bowles et al. ................... | 290/54 |
| 2011/0057449 | A1 * | 3/2011 | Marya et al. ..................... | 290/54 |
| 2012/0228875 | A1 * | 9/2012 | Hardin et al. .................... | 290/52 |
| 2012/0326536 | A1 * | 12/2012 | Nair et al. ........................ | 310/26 |

OTHER PUBLICATIONS

International Search Report and Written Opinion regarding PCT/US2012/052695, mailed Nov. 6, 2012, 9 pages.

* cited by examiner

*Primary Examiner* — Michael Zarroli
(74) *Attorney, Agent, or Firm* — Pillsbury Winthrop Shaw Pittman LLP

(57) ABSTRACT

Electrical power may be generated at a downhole position of a production well by way of electromagnetic induction through oscillating linear translation driven by the flow of a fluid being transported by the production well. In exemplary embodiments, a conductive coil is disposed in a fixed position along a length of a production pipe such that the conductive coil encircles the production pipe. A linear translation apparatus is disposed radially inward from the conductive coil and is configured to move linearly parallel to a longitudinal axis of the production pipe and within the conducting coil by harnessing mechanical energy from fluid flowing within the production pipe. Magnets are affixed to the linear translation apparatus to cause electrical power to be generated in the conductive coil by way of electromagnetic induction responsive to the magnets passing by the conductive coil when the linear translation apparatus is in motion.

11 Claims, 4 Drawing Sheets

DOWNHOLE POWER GENERATION BY WAY OF ELECTROMAGNETIC INDUCTION

FIELD OF THE DISCLOSURE

This disclosure relates to generating electrical power at a downhole position of a production well by way of electromagnetic induction through oscillating linear translation driven by the flow of a fluid being transported by the production well.

BACKGROUND OF THE DISCLOSURE

Providing electrical power to support electrical loads located in downhole positions of a production well (e.g., water, gas, and/or oil) is known. Such loads, for example, may include gauges, inflow control valves, electric submersible pumps, other completions equipment, and/or other electrical loads. In existing techniques, power is typically generated and/or stored above ground and transported down the production well via electrical wires. Significant time may be spent during completion operations in placing the wire. The monetary costs of the wire and spoolers are also non-trivial. Furthermore, such wires may be leave downhole equipment susceptible to power loss and/or interruption.

SUMMARY

One aspect of the disclosure relates to a system configured for generating electrical power at a downhole position of a production well by way of electromagnetic induction through oscillating linear translation driven by the flow of a fluid being transported by the production well. The system comprises a power generation apparatus configured to be disposed in the downhole position along a production pipe of the production well. The production pipe is configured to transport a fluid to and/or from the Earth's surface. The power generation apparatus comprises a conductive coil, a linear translation apparatus, a fluid motion capture apparatus, and one or more magnets.

The conductive coil is disposed along a length of the production pipe such that the conductive coil encircles the production pipe. The conductive coil is in a fixed position relative to the production pipe. The conductive coil is configured to be electrically coupled to an electrical load and/or a power storage apparatus. The electrical load and/or the power storage apparatus are disposed at a downhole position of the production well.

The linear translation apparatus is disposed radially inward from the conductive coil. The linear translation apparatus is configured to move linearly parallel to a longitudinal axis of the production pipe and within the conducting coil.

The fluid motion capture apparatus is affixed to the linear translation apparatus. The fluid motion capture apparatus is configured to harness mechanical energy from fluid flowing within the production pipe to effectuate linear motion of the linear translation apparatus.

The one or more magnets are affixed to the linear translation apparatus. The one or more magnets are configured to cause electrical power to be generated in the conductive coil by way of electromagnetic induction responsive to the one or more magnets passing by the conductive coil when the linear translation apparatus is in motion.

These and other features and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the technology. As used in the specification and in the claims, the singular form of "a", "an", and "the" include plural referents unless the context clearly dictates otherwise.

DETAILED DESCRIPTION

Figure 1:
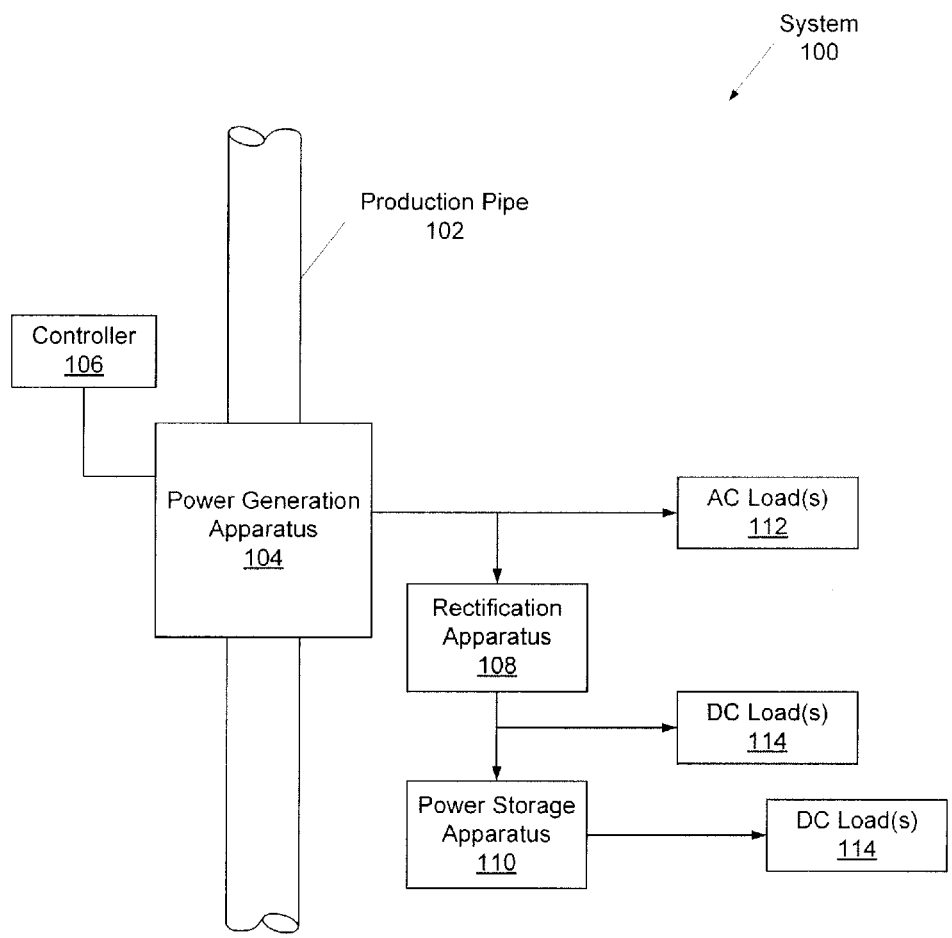
FIG. 1 illustrates a system configured for generating electrical power at a downhole position of a production well, in accordance with one or more embodiments.

FIG. 1 illustrates a system 100 configured for generating electrical power at a downhole position of a production well (i.e., a well completion), in accordance with one or more embodiments. The system 100 may harness mechanical energy from the flow of fluid being transported by the production well in order to generate electrical power. More specifically, the flow may drive electromagnetic induction through oscillating linear translation.

By generating electrical power at a downhole position, rather that at the Earth's surface, electrical power can be delivered to downhole electrical loads (e.g., gauges, inflow control valves, electric submersible pumps, other completions equipment, and/or other electrical loads) without the use of electrical wires running down the production well from the surface. Significant time may be saved during completion operations without having to place such wires. Cost savings may be realized by avoiding the use of downhole wires and spoolers. Furthermore, local electrical power generation and delivery may alleviate power loss and/or interruption to downhole equipment.

As depicted in FIG. 1, system 100 can include one or more of a production pipe 102, a power generation apparatus 104, a controller 106, a rectification apparatus 108, a power storage apparatus 110, and/or other components. The depiction of system 100 in FIG. 1 is not intended to be limiting as system 100 may include more or less components than those shown. Additionally, two or more components may be combined as singular components.

The production pipe 102 is disposed within a production well. The production pipe 102 is configured to transport a fluid to and/or from the Earth's surface. The fluid transported by production pipe 102 may include a fluid being extracted (e.g., oil or gas) or a fluid being injected (e.g., water). The fluid may be under negative pressure created by a pump (e.g., up-hole) and/or may flow through the pipe by virtue of pressure within the underlying reservoir of fluid.

The power generation apparatus 104 is configured to be disposed at a downhole position along production pipe 102. The power generation apparatus 104 generates electrical power by way of electromagnetic induction through oscillating linear translation driven by the flow of a fluid being transported by production pipe 102. The electrical power generated by power generation apparatus 104 is alternating current. As such, one or more AC loads 112 requiring alternating current electrical power may receive electrical power directly from power generation apparatus 104, in some embodiments. The AC load(s) 112 may be disposed at a downhole position of the production well. The alternating current electrical power generated by power generation apparatus 104 may be transformed to a different voltage by a transformer (not depicted). The frequency of the alternating current electrical power generated by power generation apparatus 104 may be altered by a frequency converter (not depicted). Exemplary embodiments of power generation apparatus 104 are described in further detail in connection with FIG. 2.

The controller 106 may be configured to control one or more components of system 100. In some embodiments, controller 106 may include one or more processors (not depicted) configured to execute computer software modules, electronic storage (not depicted) configured to store information received from or used by the one or more processors, and/or other components facilitating functionalities of controller 106 described herein. In some embodiments, controller 106 communicates wirelessly with a controller located above the Earth's surface. As such, components of system 100 may be controller without the use of control lines running down the production well. Various functions of controller 106 are discussed in further detail herein.

The rectification apparatus 108 is configured to convert alternating current electrical power generated by power generation apparatus 104 to direct current electrical power. The power storage apparatus 110 is configured to store direct current electrical power received from rectification apparatus 108. The power storage apparatus 110 may include one or more batteries, one or more capacitors, and/or other power storage devices. The direct current electrical power may be used by one or more DC loads 114 requiring direct current electrical power directly from rectification apparatus 108 and/or from power storage apparatus 110, according to various embodiments. The DC load(s) 114 may be disposed at a downhole position of the production well.

Figure 2:
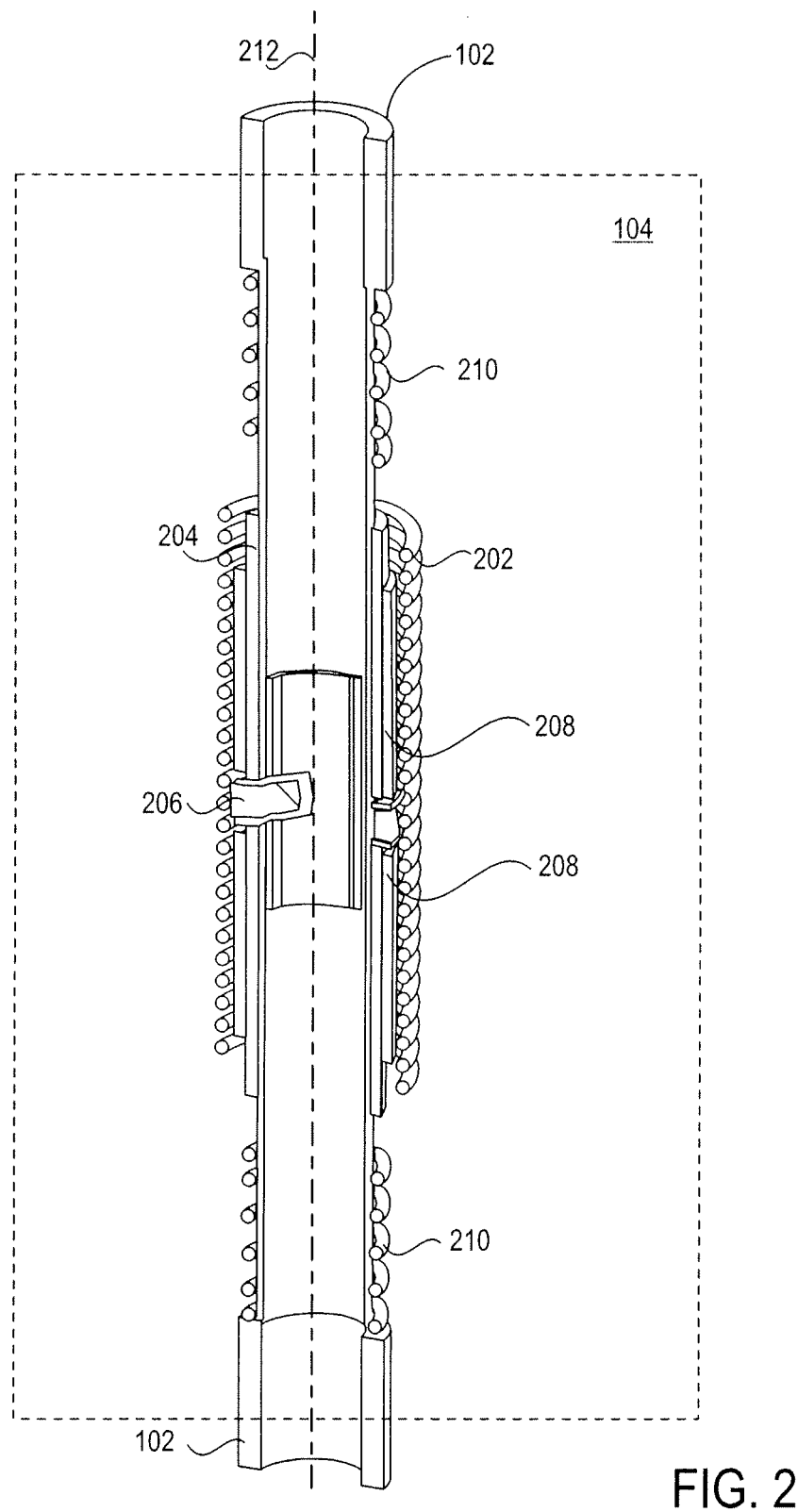
FIG. 2 illustrates a power generation apparatus, in accordance with one or more embodiments.

FIG. 2 illustrates power generation apparatus 104 of FIG. 1, in accordance with one or more embodiments. As indicated above, power generation apparatus 104 generates electrical power by way of electromagnetic induction through oscillating linear translation driven by the flow of a fluid being transported by production pipe 102. As depicted in FIG. 2, power generation apparatus 104 can include one or more of a conductive coil 202, a linear translation apparatus 204, a fluid motion capture apparatus 206, one or more magnets 208, one or more spring(s) 210, and/or other components. The depiction of power generation apparatus 104 in FIG. 2 is not intended to be limiting as power generation apparatus 104 may include more or less components than those shown. Additionally, two or more components may be combined as singular components. For example, power generation apparatus 104 may include one or more sealing mechanisms to prevent fluid from escaping from production pipe 102. As another example, one or more components of power generation apparatus 104 may be encased to protect those components from a local environment.

The conductive coil 202 is disposed along a length of production pipe 102 such that conductive coil 202 encircles production pipe 102. The conductive coil 202 is in a fixed position relative to production pipe 102, in accordance with some embodiments. The conductive coil 202 may be formed of a conducting material suitable for electromagnetic induction. The conductive coil 202 is configured to be electrically coupled to an electrical load (e.g., AC load(s) 112 and/or DC load(s) 114), a rectification apparatus (e.g., rectification apparatus 108), a power storage apparatus (e.g., power storage apparatus 110), and/or other electrical components.

The linear translation apparatus 204 is disposed radially inward from conductive coil 202. The linear translation apparatus 204 is configured to move linearly, parallel to a longitudinal axis 214 of production pipe 102 and within conductive coil 202. The linear motion of 204 is oscillatory, in accordance with some embodiments. The linear translation apparatus 204 is described in further detail in connection with FIG. 3.

The fluid motion capture apparatus 206 is affixed to linear translation apparatus 204. The fluid motion capture apparatus 206 is configured to harness mechanical energy from fluid flowing within production pipe 102 to effectuate linear motion of linear translation apparatus 204. In some embodiments, fluid motion capture apparatus 206 can include one or more of an actuating mechanism configured to alternately engage and disengage from the fluid flowing within 102. Such an actuating mechanism may be controlled by controller 106. By way of illustration, a fluid may be flowing in an upward direction in production pipe 102. The linear translation apparatus 204 may be driven upward responsive to fluid motion capture apparatus 206 engaging the fluid flow, and return downward responsive to fluid motion capture apparatus 206 disengaging the fluid flow. The fluid motion capture apparatus 206 is described in further detail in connection with FIG. 3.

The magnet(s) 208 are affixed to linear translation apparatus 204. The magnet(s) 208 are configured to cause electrical power to be generated in conductive coil 202 by way of electromagnetic induction responsive to magnet(s) 208 passing by conductive coil 202 when linear translation apparatus 204 is in motion.

In FIG. 2, spring(s) 210 are depicted as being disposed proximate to endpoints of a range of motion of linear translation apparatus 204. In some embodiments, spring(s) 210 are disposed at opposing ends of linear translation apparatus 204. The spring(s) 210 are configured to facilitate linear oscillation of linear translation apparatus 204.

By tuning various metrics associated with power generation apparatus 104, linear translation apparatus 204 may be driven at a desired oscillatory frequency, which may affect the frequency of alternating current electrical power generated by power generation apparatus 104. Such metrics may include a rate of flow of fluid in production pipe 102, a spring constant associated with spring(s) 210, mechanical motion harnessing characteristics of fluid motion capture apparatus 206, a weight of individual components of power generation apparatus 104, length of a range of motion of linear translation apparatus 204, strength of magnetic field of magnet(s) 208, resistivity of conductive coil 202, number of loops of conductive coil 202, and/or other metrics. The amplitude of alternating current electrical power generated by power generation apparatus 104 may also by adjusted by tuning one or more of these metrics.

Figure 3:
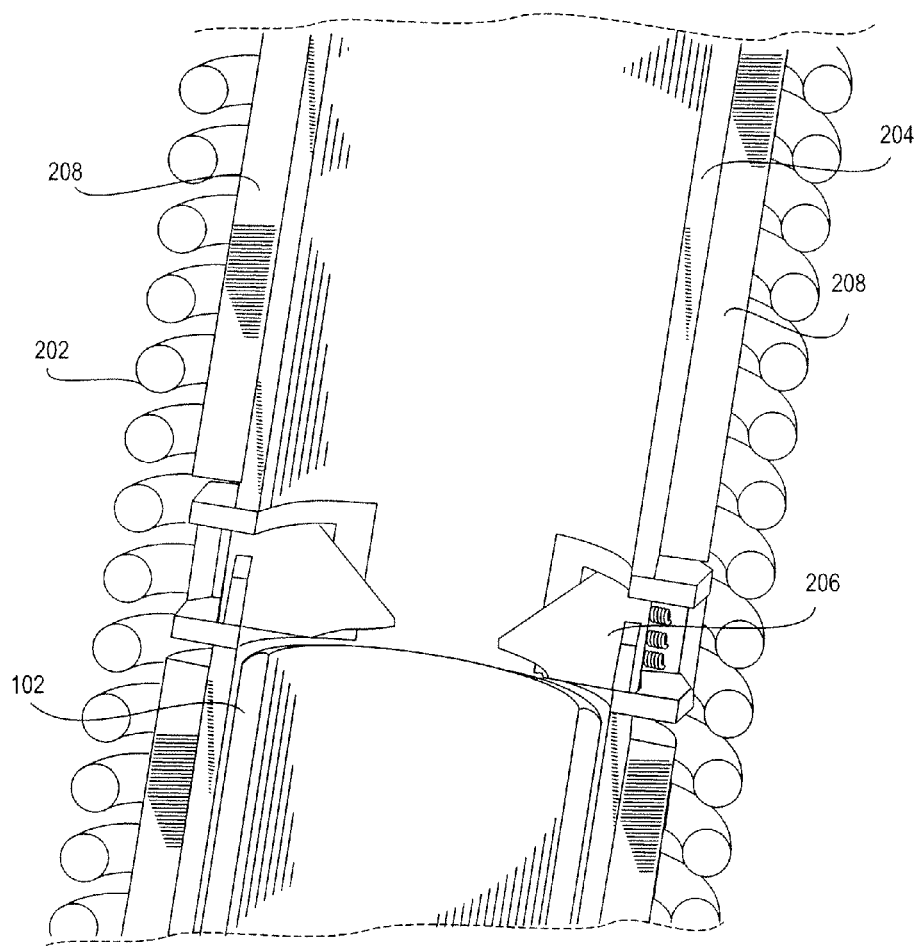
FIG. 3 illustrates a linear translation apparatus, in accordance with one or more embodiments.

FIG. 3 illustrates linear translation apparatus 204 of FIG. 2, in accordance with one or more embodiments. Here, linear translation apparatus 204 is shown as fitting over production pipe 102. As indicated above, conductive coil 202 is in a fixed position relative to production pipe 102. The fluid motion capture apparatus 206 and magnet(s) 208 are affixed to linear translation apparatus 204. The fluid motion capture apparatus 206 may engage a fluid flowing in production pipe 102 by contracting inward, and may disengage from the fluid by dilating outward. When fluid motion capture apparatus 206 engages the fluid flowing in production pipe 102, linear translation apparatus 204 may move within its range of motion in the direction of flow of the fluid. The linear translation apparatus 204 may move within its range of motion in the opposite direction of flow of the fluid in production pipe 102 when fluid motion capture apparatus 206 disengages the fluid.

Figure 4:
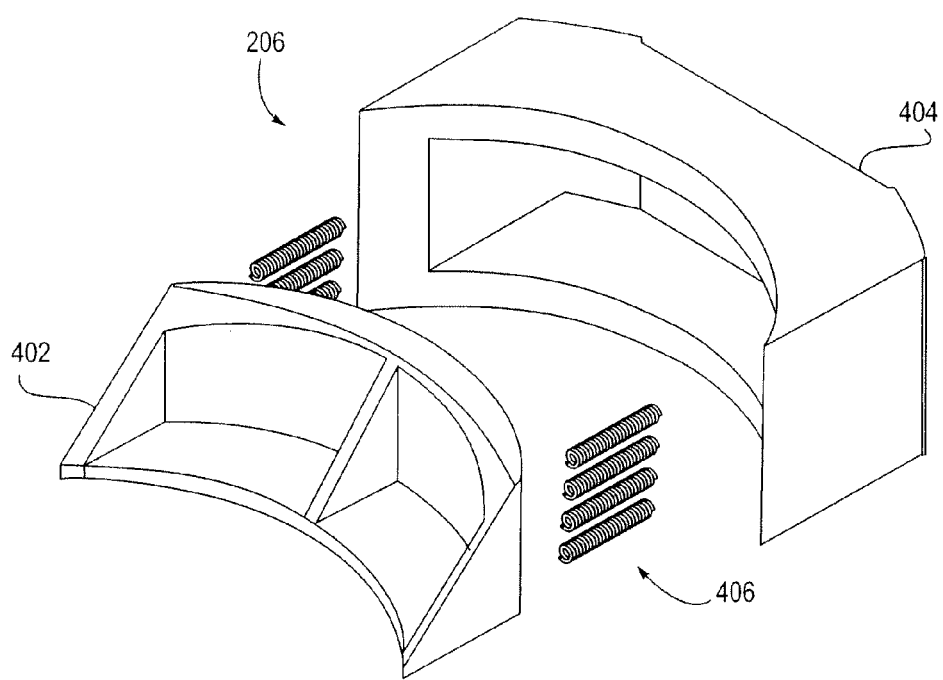
FIG. 4 illustrates a fluid motion capture apparatus, in accordance with one or more embodiments.

FIG. 4 illustrates fluid motion capture apparatus 206 of FIG. 2, in accordance with one or more embodiments. As depicted in FIG. 4, fluid motion capture apparatus 206 can include one or more of a flange 402, a flange bracket 404, one or more springs 406, and/or other components. The depiction of fluid motion capture apparatus 206 in FIG. 4 is not intended to be limiting as fluid motion capture apparatus 206 may include more or less components than those shown. Additionally, two or more components may be combined as singular components. For example, fluid motion capture apparatus 206 may include a mechanism of actuating flange 402 in order to engage and disengage fluid flowing in production pipe 102. Furthermore, it will be appreciated that other approaches for engaging and disengaging fluid flowing in production pipe 102 are contemplated.

The flange bracket 404 may attach to linear translation apparatus 204 (see FIGS. 2 and 3). The flange 402 may couple with flange bracket 404 such that flange 402 moves inward and outward within production pipe 102. The spring(s) 406 may facilitate contraction of flange 402. Controller 106 (see FIG. 1) may be configured to control contraction and/or dilation of flange 402. Such control may facilitate adjustment of power generation characteristics (e.g., frequency and/or amplitude) of power generation apparatus 104.

Although the technology has been described in detail for the purpose of illustration based on what is currently considered to be the most practical and preferred embodiments, it is to be understood that such detail is solely for that purpose and that the technology is not limited to the disclosed embodiments, but, on the contrary, is intended to cover modifications and equivalent arrangements that are within the spirit and scope of the appended claims. For example, it is to be understood that the present technology contemplates that, to the extent possible, one or more features of any embodiment can be combined with one or more features of any other embodiment.

What is claimed is:

1. A system configured for generating electrical power at a downhole position of a production well by way of electromagnetic induction through oscillating linear translation driven by the flow of a fluid being transported by the production well, the system comprising:

a power generation apparatus configured to be disposed in the downhole position along a production pipe of the production well, the production pipe being configured to transport a fluid to and/or from the Earth's surface, the power generation apparatus comprising:

a conductive coil disposed along a length of the production pipe such that the conductive coil encircles the production pipe, the conductive coil being in a fixed position relative to the production pipe, the conductive coil being configured to be electrically coupled to an electrical load and/or a power storage apparatus, the electrical load and/or the power storage apparatus being disposed at a downhole position of the production well;

a linear translation apparatus disposed radially inward from the conductive coil, the linear translation apparatus being configured to move linearly parallel to a longitudinal axis of the production pipe and within the conducting coil;

a fluid motion capture apparatus affixed to the linear translation apparatus, the fluid motion capture apparatus being configured to harness mechanical energy from fluid flowing within the production pipe to effectuate linear motion of the linear translation apparatus; and one or more magnets affixed to the linear translation apparatus, the one or more magnets configured to cause electrical power to be generated in the conductive coil by way of electromagnetic induction responsive to the one or more magnets passing by the conductive coil when the linear translation apparatus is in motion.

2. The system of claim 1, wherein the fluid transported by the production pipe includes one or more of water, gas, or oil.

3. The system of claim 1, wherein the linear motion of the linear translation apparatus is oscillatory.

4. The system of claim 1, wherein the fluid motion capture apparatus includes an actuating mechanism configured to alternately engage and disengage from the fluid flowing within the production pipe.

5. The system of claim 1, further comprising one or more springs configured to facilitate linear oscillation of the linear translation apparatus.

6. The system of claim 5, wherein individual ones of the one or more springs are disposed proximate to one or both endpoints of a range of motion of the linear translation apparatus.

7. The system of claim 5, wherein individual ones of the one or more springs are disposed at opposing ends of the linear translation apparatus.

8. The system of claim 1, further comprising a rectification apparatus configured to convert electrical power generated by the power generation apparatus to direct current electrical power.

9. The system of claim 8, wherein the power storage apparatus is configured to store direct current electrical power received from the rectification apparatus.

10. The system of claim 1, wherein the power storage apparatus includes one or both of a battery or a capacitor.

11. The system of claim 1, further comprising a controller configured to control the fluid motion capture apparatus.

* * * * *